3,046,252
BAKING POLYESTER RESIN
James R. Stephens, Gary, Ind., assignor to Standard Oil Company, Chicago, Ill., a corporation of Indiana
No Drawing. Filed Aug. 15, 1960, Ser. No. 49,433
7 Claims. (Cl. 260—77)

This invention relates to resins suitable for the preparation of baked surface coatings and particularly to water soluble forms thereof.

There have appeared recently baking resins, i.e., resins capable of forming surface coating films when baked at temperatures on the order of 400° F. These baking resins are derived from trimellitic anhydride, adipic acid, and lower molecular weight glycols such as neopentyl glycol. It has been observed by co-workers of instant inventor that baking resins having cure temperatures on the order of 250° F. can be prepared from a mixture of the trimellitic anhydride derived resin and a melamine type of resin. However, the surface coating films produced by this combination are low in strength as determined by the standard impact test; in extreme instances these films are very brittle.

It has been discovered that a baking resin having cure temperatures on the order of 250° to 300° F. and producing remarkedly tough surface coating films is obtained by reacting a polyester product of the condensation reaction of a benzene tricarboxylic acid or anhydride with either an alkylene oxide or alkylene glycol with hexamethoxymethyl melamine and either an alkanol or ether-alkanol at a temperature between about 100° F. and 350° F. until the reactants form a single phase liquid product which is the baking resin.

One of the reactants is a polyester having an appreciable number of free carboxyl groups and free hydroxyl groups. The acid number of this polyester reactant is from about 25 to about 100 and the hydroxyl number of the polyester reactant is from about 100 to about 200. The polyester reactant is the product of the condensation reaction of benzene tricarboxylic acids or the corresponding anhydrides. Particularly suitable acids are trimellitic acid, trimesic acid, hemimellitic acid, trimellitic anhydride, and hemimellitic anhydride.

The tricarboxylic acid is condensed with either an alkylene oxide or an alkylene glycol. The alkylene oxides contain from 2 to 4 carbon atoms. These oxides are ethylene oxide, propylene oxide, and butylene oxide. Mixtures of two or more oxides may be used. The alkylene glycols may be either the simple glycols or ether glycols and contain from 2 to 6 carbon atoms. Illustrations of these glycols are ethylene glycol, propylene glycol, 1,4-butanediol, 1,3-hexanediol, diethylene glycol, dipropylene glycol, and triethylene glycol. Propylene oxide is a preferred oxide and diethylene glycol is a preferred glycol.

The tricarboxylic acid and the oxide or glycol are condensed in proportions such that the combination of desired acid number and hydroxyl number is obtained. It is to be understood that it may not be possible to obtain simultaneously a low acid number and a low hydroxyl number within the ranges set forth.

The polyester reactant is prepared by reacting the defined acid and the alkylene oxide in desired proportions in the presence of an alkaline catalyst at a temperature between about 70° F. and about 400° F. It is preferred to employ a reaction temperature below about 250° F. in order to avoid cross-linking and gelling. As catalysts there may be employed inorganic or organic bases such as alkali metal hydroxide, calcium oxide, sodium amide, secondary amines such as diethylamine, dibutylamine, piperidine and the like and tertiary amines such as trimethylamine, triethanolamine, pyridine and the like.

Amines are preferred and are usually present in an amount of about 0.1% to about 5% based on the weight of acid charged. Suitably, the reaction is effected during a period of 2–4 hours, more commonly 2–8 hours.

The acid and the defined glycol are condensed under well established condensation reaction conditions for this type of reaction. In general, the condensation reaction is carried out at a temperature between about 200° F. and about 450° F., and more usually about 300° F. The reaction is carried out for a time producing the desired acid number and/or hydroxyl number. When operating with trimellitic anhydride as the acid, it is desirable to observe the reacting mixture closely when approaching the completion of the reaction at the lower acid number products. The reaction mixture has a tendency to reach the gel point in a more or less abrupt fashion. However, observation of the reaction zone permits ready completion of the reaction without objectionable gelation.

The second reactant utilized in preparing the baking resin of the invention is hexamethoxymethyl melamine (N,N,N',N',N'',N'' - hexamethoxymethyl - 2,4,6 - triamino triazine). Either the monomer or one of the polymeric forms of this compound may be used.

The third reactant utilized in the preparation of the baking resin of the invention may be either an alkanol or an ether-alkanol or a mixture of these. The alkanols and ether-alkanols contain not more than about 22 carbon atoms. Illustrative of the alkanols are methanol, ethanol, n-butanol, 2-ethylhexanol, n-decanol, lauryl alcohol, myristyl alcohol, cetyl alcohol, stearyl alcohol, and docosanol. While any ether-alkanol may be utilized, those ether-alkanols derived from the alkylation of glycols are particularly suitable. It is preferred to utilized alkanols or ether-alkanols containing from 4 to 10 carbon atoms in the molecule.

In the alkylene glycol monoalkyl ether, each alkylene unit present in the ether contains from 2 to 3 carbon atoms, i.e., the alkylene units are either ethylene or propylene; the alkyl group present in the ether contains from 1 to 8 carbon atoms. Numerous species of the defined ethers are available commercially under the "Cellosolve" and the "Carbitol" trade names. The Cellosolves are alkylation reaction products of simple glycols and alkanols. The Carbitols are alkylation reaction products of ether glycols and alkanols. Illustrative glycols are ethylene glycol and propylene glycol. Illustrative ether glycols are diethylene glycol, triethylene glycol, tetraethylene glycol, dipropylene glycol, and tripropylene glycol. Illustrative alkanols are methanol, ethanol, isopropanol, n-butanol, t-butyl alcohol, and octanol. Illustrative of the nomenclature utilized herein is the alkylation product of diethylene glycol with ethanol which product is known as diethylene glycol monoethyl ether or 2-(2-ethoxyethoxy)ethanol or (ethyl)Carbitol. And the product of ethanol and ethylene glycol is known as ethylene glycol monoethyl ether or 2-ethoxyethanol or (ethyl)Cellosolve.

The above defined reactants are charged to the reaction vessel substantially simultaneously in order to obtain the best quality baked films. A reasonable amount of variation in the proportions of the reaction mixture is permissible. In general, the proportions of the defined reactants charged to the reaction zone, as parts by weight are: the defined polyester, from about 40 to about 90 parts; the defined melamine, from about 5 to about 50 parts; and the defined alkanols or ether-alkanols, from about 10 to about 60 parts. More usually, the proportions of the defined reactants are in the amounts, as parts by weight: the defined polyester, from about 40 to about 60 parts; the defined melamine, from about 10 to about 20 parts; and the defined alkanols or ether alkanols, from about 40 to about 60 parts.

The reactants are intermingled in the reaction zone and maintained at a temperature between about 100° F. and 350° F. until the reaction is complete. Completion of the reaction is evidenced by the formation in the reaction zone of a single liquid phase product; the liquid product is the baking resin product of the invention.

The baking resin product is soluble in the organic solvents conventionally used for alkyd resins. Examples of such solvents are benzene, toluene, xylene, ethanol, butanol, acetone, methylethyl ketone, and mixtures of these. Films can be let down on suitable surfaces from solutions of the baking resin of the invention in such organic solvents, which films cure in times on the order of 15–30 minutes at temperatures on the order of 250–300° F. These films are characterized by extreme toughness as measured by the impact test.

It is preferred to convert the organic solvent soluble form of the baking resin of the invention to a water soluble form for use in the preparation of surface coatings.

*Water Soluble Baking Resin*

The water soluble resin consists of the organic solvent soluble resin reacted with an alkaline reacting agent. The resin and the agent are reacted until a water soluble form is obtained. Usually enough agent is used to neutralize the acidity of the resin; less may be used. The amount of alkaline reacting material is most readily determined by following the pH of the aqueous medium. The resin passes into solution substantially completely at a pH of about 5. In practically all instances, the resin will be in a complete solution at a pH of about 6. The use of alkaline agent in excess of that needed to bring all the polyester product into solution is not harmful, at least up to a water solution pH of about 8. It is preferred to have the aqueous solution somewhat on the acid side or neutral, i.e., a pH of from 6 to 7.

The alkaline reacting agent may be ammonia or alkylamine, or heteroamine or an alkanolamine. Ammonium hydroxide as the aqueous solution containing 20–28% is suitable. The alkyl amines, particularly the lower molecular weight containing not more than 4 carbon atoms in each alkyl group, are especially suitable. The alkanolamines, such as 2-amino-2-methyl-1-propanol, ethanolamine and dimethylethanolamine, are especially suitable. The heteroamines, such as morpholine, pyridine, and piperdine may be used. The type of alkaline reacting material used is determined in part by the characteristics desired in the final water soluble resin; also, by the type of resin product which is to be converted to a water soluble form.

The neutralization reaction is carried out by contacting the resin and the aqueous alkaline reacting medium. It is preferred that it be warm, i.e., maintained in the region of 100–160° F. The two are agitated until the resin has passed into solution. The warm solutions of the water soluble resin are clear liquids usually containing some opalescent appearance; the solutions may be colorless or colored, depending on the particular water soluble resin present.

*Illustration*

A particular baking resin of the invention was prepared as follows: Trimellitic anhydride, 600 grams, and propylene oxide, 454 grams, were condensed using pyridine catalyst, 3 ml. The condensation reaction went smoothly and the polyester product had an acid number of 38. The hydroxyl number was 109.

Hexamethoxymethyl melamine monomer was prepared according to the procedure of A. Gams, G. Widmer, and W. Fisch, Helv. Chim. Acta., 24E, 302 (1941). The product melted at about 40° C. It was used as a 60% solution in methanol.

The ether-alkanol reactant was commercial product sold as butyl Carbitol.

The following proportions of reactants were charged to a flask provided with an agitator: polyester product, 50 grams; melamine, 20.8 grams; and butyl Carbitol, 50 grams. The contents of the flask were held for one hour at 185° F., at which time only a single liquid material was present in the flask.

The liquid resin product was cooled to about 150° F. and a solution of 50 g. of distilled water and 8.5 g. of triethylamine was added. The resin readily passed into solution with the water to form a relatively viscous liquid solution.

A plain carbon steel panel was coated with the aqueous solution of resin and permitted to dry for 20 minutes at 75° F. The panel was placed in an oven for 20 minutes at 250° F. The film produced on the steel panel after baking was 1.0 mil thickness. The film was very hard and was not affected by contact with liquid acetone. In the standard impact test, no visible damage was done to the film at an impact of 160 inch-pounds.

A resin was prepared as above except that hexamethoxymethylol melamine was used as the melamine reactant. Surprisingly, the resin containing this closely similar reactant produced films that were very brittle.

Thus, having described the invention, what is claimed is:

1. A baking resin prepared by the reaction of (I) a polyester product of the condensation reaction of (*a*) an acidic member selected from the class consisting of trimellitic acid, trimellitic anhydride, trimesic acid, hemimellitic acid and hemimellitic anhydride with (*b*) a member selected from the class consisting of (*i*) alkylene oxides containing 2–4 carbon atoms and (*ii*) alkylene glycols containing 2–6 carbon atoms to obtain a product characterized by an acid number of about 25–100 and hydroxyl number of about 100–200 with (II) hexamethoxymethyl melamine and (III) an alcohol selected from the class consisting of alkanols and ether-alkanols, said alkanols containing not more than about 22 carbon atoms, said reactants I, II, and III being charged to the reaction zone in proportions, as parts by weight of each of said reactants, I, 40–90; II, 5–50; and III, 10–60, said reactants being maintained at a temperature between about 100° F. and 350° F. until a baking resin product is obtained within the reaction zone in the form of a single phase liquid product.

2. The baking resin of claim 1 wherein said polyester is the product of trimellitic anhydride and propylene oxide.

3. The baking resin of claim 1 wherein said polyester is the product of trimellitic anhydride and diethylene glycol.

4. The baking resin of claim 1 wherein said ether-alkanol is an alkylene glycol monoalkyl ether.

5. The baking resin of claim 4 wherein said monoalkyl ether is diethylene glycol monobutyl ether.

6. The baking resin of claim 1 wherein said proportions are I, 40–60; II, 10–20; and III, 40–60.

7. A water soluble baking resin prepared by reacting an alkaline agent selected from the class consisting of ammonia, alkylamines, heterocyclicamines and alkanolamines with a baking resin of claim 1.

References Cited in the file of this patent

UNITED STATES PATENTS

| | | |
|---|---|---|
| 2,048,778 | Brubaker | July 28, 1936 |
| 2,562,878 | Blair | Aug. 7, 1951 |

OTHER REFERENCES

Helvetica Chemica Acta, 24E, 302E–318E (1941), article by Gams et al.